March 20, 1962
A. W. KNOBLAUCH
3,025,917
ICE DRILL
Filed June 11, 1959
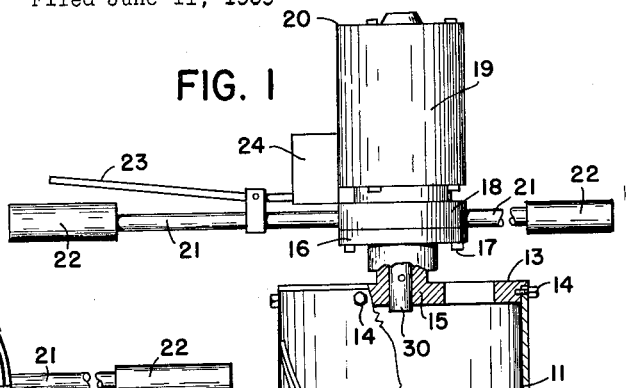
FIG. 1
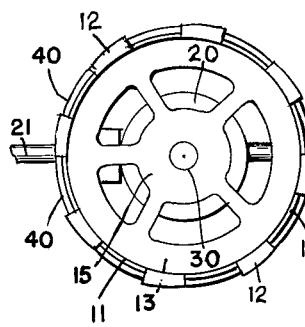
FIG. 2
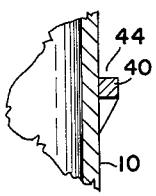
FIG. 3
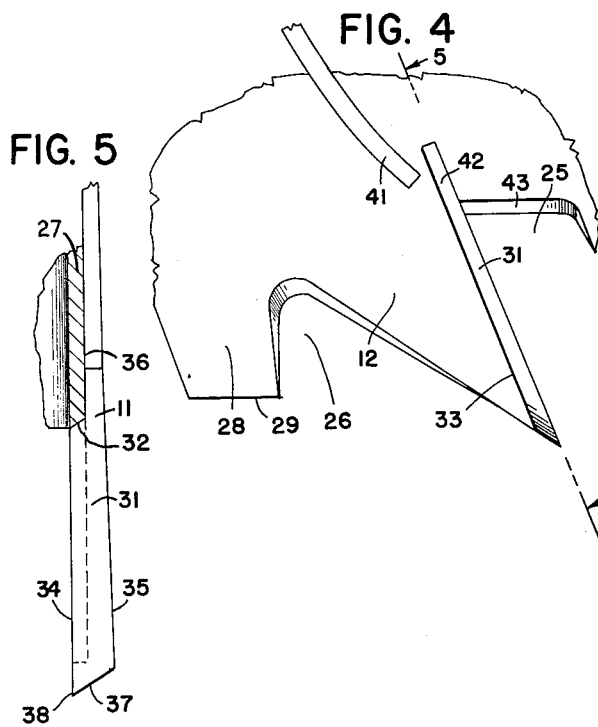
FIG. 4
FIG. 5
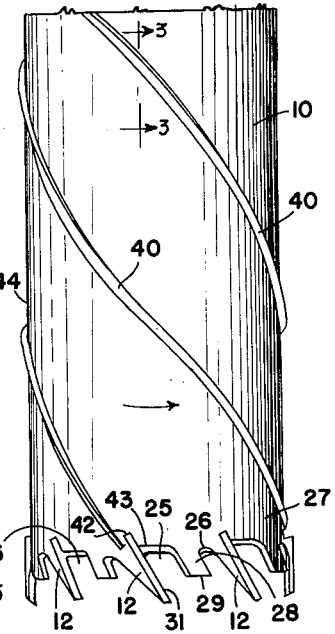
INVENTOR.
ARTHUR W. KNOBLAUCH
BY
Caswell & Lagaard
ATTORNEY

United States Patent Office 3,025,917
Patented Mar. 20, 1962

3,025,917
ICE DRILL
Arthur W. Knoblauch, 1662 W. Minnehaha,
St. Paul, Minn.
Filed June 11, 1959, Ser. No. 819,592
1 Claim. (Cl. 175—18)

The herein disclosed invention relates to ice drills and has for an object to provide an ice drill by means of which holes may be drilled in ice for the purpose of ice fishing and in which the holes may be rapidly drilled.

Another object of the invention resides in providing an ice drill which will not readily clog by the chips produced in the operation of the same.

A still further object of the invention resides in constructing the drill with a tubular body having cutting teeth upon the lower end thereof and in constructing said teeth so as to provide clearance at the cutting edge thereof to prevent clogging of the teeth and binding of the drill in the ice as the cutting progresses.

An object of the invention resides in constructing the teeth with cutting blades attached thereto at the leading edges thereof.

An object of the invention resides in arranging the cutting blades of the teeth at an angle relative to an element of the body of the drill and projecting outwardly beyond the outer surface of the body.

Another object of the invention resides in providing a helixes attached to the outer surfaces of the body and lying substantially in continuation of the cutting edges of some of the blades and serving to elevate the chips as they are removed by the cutting blades.

A still further object of the invention resides in providing runners disposed between the teeth and riding on the ice, said runners being disposed above the cutting tips of the blades to limit the depth of the cut.

An object of the invention resides in constructing the runners from the metal forming the lower marginal portion of the body.

Other objects of the invention reside in the novel combination and arrangement of parts and in the details of construction hereinafter illustrated and/or described.

In the drawings:

FIG. 1 is an elevational view of an ice drill illustrating an embodiment of the invention with portions thereof broken away.

FIG. 2 is a bottom view of the structure shown in FIG. 1.

FIG. 3 is a fragmentary sectional detail view taken on line 3—3 of FIG. 1 and drawn to a greater scale.

FIG. 4 is a fragmentary view of a portion of the lower end of the drill illustrating one of the teeth of the invention and drawn to the same scale as FIG. 3.

FIG. 5 is a longitudinal elevational sectional view taken on line 5—5 of FIG. 4.

The invention consists of a tubular body 10 which has a bore 11 which is of suitable diameter to form the desired size of hole in the ice. This body is of a length sufficient to cut through ice of the desired thickness. The lower end of the drill is formed with cutting teeth 12 and the upper end of the same has attached to it a head 13. Head 13 is received in the upper end of the bore 11 and is held attached thereto by means of screws 14. The head 13 is formed with a bushing 15 which has a flange 16 extending outwardly therefrom. Flange 16 is bolted by means of bolts 17 to a flange 18 formed on the case 19 of an electric motor 20. The armature shaft 30 of motor 20 extends through the bushing 15 and is secured thereto. The motor 20 has handles 21 extending outwardly from the flange 18 and at the outward end of which hand grips 22 are applied. A thumb operated switch lever 23 is pivoted to one of the handles 21 and operates a switch 24 by means of which the motor may be started and stopped.

The teeth 12 are formed by means of pairs of trailing notches 25 and leading notches 26 formed in the lower marginal portion 27 of the body 10. These notches also form depending portions 28 which have flat circumferentially disposed surfaces 29 and serve as runners or limiting means for supporting the drill on the ice and limiting the depth of the cut.

The teeth 12 are provided with cutting blades 31, best shown in detail in FIGS. 4 and 5. These blades are made of tool steel and have rabbets 32 in the same formed at their upper ends and which receive the marginal portion 27 of the body 10. These blades overlie the edges 33 of the teeth 12 and are welded thereto. The blades 31 lie flush with the bore 11 of body 10 on the inner edges 34 thereof while the outer edges 35 extend outwardly beyond the outer surface 36 of said body and said cutting blades are tapered, being the widest at the lowermost portions thereof. These blades have beveled cutting edges 37 at the tips 38 of said blades.

Attached to the outer surface 36 of the body 10 are a number of helixes 40 which are constructed from square stock rolled into the desired shape and welded to the body proper. These helixes terminate at their lower ends 41 just in back of the uppermost portions 42 of the blades 31. The upper edges 43 of the marginal portion 27 forming the top of the grooves 25 and 26 are formed with a bevel which causes chips severed by the blade 31 to flow upwardly and outwardly of the body 10 and into the space 44 formed by helixes 40 and lying between the surface 36 of body 10 and the surface of the ice cut.

The method of operation of the invention is as follows: The device is grasped by the two hand grips 22 which support the entire drill and the motor 20 and the drill lowered to the position where the hole is to be made. While steadying the drill through the hand grips 22, lever 23 is depressed closing switch 24 and energizing the motor 20 from a storage battery, not shown, and which may be the storage battery of an automobile. The entire drill including the body 10 and attached structure is rotated through shaft 30 of motor 20 and the drill moved in the direction of the arrow shown in FIG. 1. This causes the blades 31 to dig into the ice and form chips therein as the drill descends through the ice. It will be noted that the edges 33 of teeth 12 as well as the blades 31 are substantially helically inclined in the same general direction as the helixes 40. Due to the inclination of the blades 31 and to the beveling of the edges 43 of the marginal portion 27 in the upper ends of slots 25, the chips are directed into the space 44 and through the action of the helixes 40 are elevated and discharged above the surface of the ice. The drill travels rapidly through the ice and when the same penetrates the ice the motor is stopped and the drill removed. During its downward progress, the runners 28 support the drill and determine the depth of the cut. After the drill has been removed, the core formed in the ice is withdrawn and the hole is open and ready for use.

The drill is extremely advantageous in that the hole can be rapidly made and without the manual exertion required in chopping the hole with a chisel. A smooth hole is formed and ice may be cut of any desired depth to within the limits of the length of the drill. The drill is comparatively light and can be easily handled while the weight of the same is sufficient to cause the proper feed of the drill so that no appreciable downward pressure is required by the operator.

Changes in the specific form of the invention, as herein described, may be made within the scope of what is claimed without departing from the spirit of the invention.

Having described the invention, what is claimed as new and desired to be protected by Letters Patent is:

An ice drill comprising a tubular body having pairs of inclined notches at the lower end thereof and providing spaced pointed teeth therebetween with inclined leading edges, blades overlying and resting upon the leading edges of said teeth, said blades being attached to said teeth along the leading edges of the teeth and extending outwardly of the outer surface of said body, the leading edges of said teeth resisting the thrust on said blades occasioned during cutting and means disposed on the exterior surface of said body and serving to elevate the chips cut by said blades.

References Cited in the file of this patent

UNITED STATES PATENTS

| | | |
|---|---|---|
| 2,723,835 | Reese et al. | Nov. 15, 1955 |
| 2,856,157 | Chapin et al. | Oct. 14, 1958 |
| 2,880,968 | Titeca | Apr. 7, 1959 |
| 2,893,695 | Gerlikowski | July 7, 1959 |